(12) United States Patent
Seo et al.

(10) Patent No.: US 11,568,202 B2
(45) Date of Patent: Jan. 31, 2023

(54) METHOD AND APPARATUS FOR DETERMINING GOODNESS OF FIT RELATED TO MICROPHONE PLACEMENT

(71) Applicant: LG ELECTRONICS INC., Seoul (KR)

(72) Inventors: Jae Pil Seo, Seoul (KR); Keun Sang Lee, Seoul (KR); Dong Hoon Yi, Yongin-si (KR); Byoung Gi Lee, Seongnam-si (KR); Hyeon Sik Choi, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 682 days.

(21) Appl. No.: 16/577,495

(22) Filed: Sep. 20, 2019

(65) Prior Publication Data
US 2020/0012920 A1    Jan. 9, 2020

(30) Foreign Application Priority Data

Aug. 19, 2019  (KR) ........................ 10-2019-0100994

(51) Int. Cl.
*G06N 3/04*  (2006.01)
*G06K 9/62*  (2022.01)
(Continued)

(52) U.S. Cl.
CPC .......... *G06N 3/0427* (2013.01); *G06F 30/20* (2020.01); *G06K 9/6256* (2013.01); *G06N 3/08* (2013.01);
(Continued)

(58) Field of Classification Search
CPC ........ G06N 3/0427; G06N 3/08; G06F 30/20; G06K 9/6256; H04R 29/004
(Continued)

(56) References Cited

U.S. PATENT DOCUMENTS 6,168,568 B1 * 1/2001 Gavriely ................ A61B 5/087
                                                          600/529
8,204,248 B2 * 6/2012 Haulick ................... H04R 1/40
                                                          381/94.2
(Continued)

FOREIGN PATENT DOCUMENTS

JP   2004120377    *  4/2004   ............ G10L 15/28
JP   2005-140860 A    6/2005
(Continued)

OTHER PUBLICATIONS

Vera-Diaz et al. (Towards End-to-End Acoustic Localization Using Deep Learning: From Audio Signals to Source Position Coordinates,2018, MDPI, pp. 1-22) (Year: 2018).*
(Continued)

*Primary Examiner* — Iftekhar A Khan
(74) *Attorney, Agent, or Firm* — Birch, Stewart, Kolasch & Birch, LLP

(57) ABSTRACT

Disclosed is an apparatus for determining goodness of fit related to microphone placement capable of communicating with other electronic devices and an external server in a 5G communication network, in which an artificial intelligence (AI) algorithm and/or a machine learning algorithm are executed. The apparatus includes an inputter, a communicator, a storage, and a processor. As the apparatus is provided, sound recognition effects can be improved.

19 Claims, 5 Drawing Sheets

(51) Int. Cl.
  *G06N 3/08*    (2006.01)
  *H04R 29/00*   (2006.01)
  *G06F 30/20*   (2020.01)
  *G06V 20/20*   (2022.01)
  *G06F 111/10*  (2020.01)

(52) U.S. Cl.
  CPC ........... *G06V 20/20* (2022.01); *H04R 29/004* (2013.01); *G06F 2111/10* (2020.01)

(58) Field of Classification Search
  USPC .......................................................... 706/19
  See application file for complete search history.

(56) References Cited

U.S. PATENT DOCUMENTS

| | | | | |
|---|---|---|---|---|
| 8,665,305 | B2* | 3/2014 | Jeong | H04N 7/14 348/207.99 |
| 8,676,728 | B1* | 3/2014 | Velusamy | H04R 3/005 706/62 |
| 9,813,810 | B1* | 11/2017 | Nongpiur | G06N 3/08 |
| 2002/0120443 | A1* | 8/2002 | Epstein | G10L 15/20 704/E15.039 |
| 2005/0045027 | A1* | 3/2005 | Celi | G10H 3/188 84/723 |
| 2006/0013409 | A1* | 1/2006 | Desloge | A61F 11/14 381/74 |
| 2010/0027817 | A1* | 2/2010 | Dyer | H04R 19/016 381/191 |
| 2010/0201807 | A1* | 8/2010 | McPherson | H04R 1/08 341/20 |
| 2011/0064233 | A1* | 3/2011 | Van Buskirk | G10H 1/125 381/61 |
| 2014/0260906 | A1* | 9/2014 | Welch | G10H 1/02 84/602 |
| 2015/0024799 | A1* | 1/2015 | Swanson | G10H 3/182 381/92 |
| 2016/0234593 | A1* | 8/2016 | Matsumoto | G01S 5/20 |
| 2017/0064478 | A1* | 3/2017 | Lai | H04R 3/005 |
| 2017/0278519 | A1* | 9/2017 | Visser | G10L 19/002 |
| 2017/0295436 | A1* | 10/2017 | Pedersen | H04R 25/70 |
| 2017/0353789 | A1* | 12/2017 | Kim | H04R 5/027 |
| 2018/0020305 | A1* | 1/2018 | Hardek | H04R 29/004 |
| 2018/0084338 | A1* | 3/2018 | Bostick | H04R 3/005 |
| 2018/0105270 | A1* | 4/2018 | Xu | G10K 11/17881 |
| 2018/0136899 | A1* | 5/2018 | Risberg | H04R 3/04 |
| 2018/0234612 | A1* | 8/2018 | Kunkel | H04N 5/23203 |
| 2019/0236416 | A1* | 8/2019 | Wang | H04R 1/222 |
| 2019/0266404 | A1* | 8/2019 | Spivack | G06V 20/20 |
| 2020/0344548 | A1* | 10/2020 | Lazar | H04R 3/04 |
| 2020/0413189 | A1* | 12/2020 | Baughman | G06N 20/20 |

FOREIGN PATENT DOCUMENTS

| | | | | |
|---|---|---|---|---|
| JP | 2005-303898 A | | 10/2005 | |
| JP | 2019-97100 A | | 6/2019 | |
| KR | 10-2019-0057846 A | | 5/2019 | |
| KR | 10-1978688 B1 | | 5/2019 | |
| KR | 2019104100 A | * | 9/2019 | ......... G06F 17/5009 |

OTHER PUBLICATIONS

Kim et al. (Recurrent Models for Auditory Attention in Multi-Microphone Distance Speech Recognition, 2016, ICLR, pp. 1-9) (Year: 2016).*

* cited by examiner

METHOD AND APPARATUS FOR DETERMINING GOODNESS OF FIT RELATED TO MICROPHONE PLACEMENT

CROSS-REFERENCE TO RELATED APPLICATION

This present application claims benefit of priority to Korean Patent Application No. 10-2019-0100994, entitled "Method and apparatus for determining goodness of fit related to microphone placement" filed on Aug. 19, 2019, in the Korean Intellectual Property Office, the entire disclosure of which is incorporated herein by reference.

BACKGROUND

1. Technical Field

The present disclosure relates to a method and apparatus for determining goodness of fit related to microphone placement, and more particularly, to a method and apparatus for determining goodness of fit related to microphone placement when placing a microphone on a target device.

2. Description of Related Art

Generally, a device for speech recognition includes at least one microphone for collecting a spoken utterance of a user. In this case, one of the methods for improving speech recognition performance is to minimize a lost signal by reinforcing speech inputted into the microphone.

Accordingly, there is a need for a method for effectively placing a microphone and an object generating noise to have a space therebetween, for a device equipped with the microphone.

Related Art 1 discloses a device having a plurality of microphones, and when each point in which a microphone is placed touches a floor, the operation of the corresponding microphone is deactivated.

However, the disclosed device only deactivates the operation of the microphone in certain cases (when a microphone placement point touches a floor), and there is a limit in that there is no consideration for a noise generating module inside the device.

Related Art 2 discloses an air conditioner that, when noise is generated, detects a point corresponding to the noise through a microphone and controls the noise of the detected point.

The disclosed air conditioner uses a microphone to search for a noise generating point, but there is a limit in that it cannot consider the placement state and operation state inside the device from the designing stage.

SUMMARY OF THE INVENTION

An aspect of the present disclosure is to provide a method and apparatus for placing a microphone in an optimal position of a target device in order to reinforce sound recognition.

Another aspect of the present disclosure is to provide a method and apparatus for determining goodness of fit related to microphone placement in consideration of sound directionality and intensity.

Another aspect of the present disclosure is to provide a method and apparatus for determining goodness of fit related to microphone placement by using a neural network algorithm.

The present disclosure is not limited to what has been described above, and other aspects not mentioned herein will be apparent from the following description to one of ordinary skill in the art to which the present disclosure pertains.

In an aspect, there is provided a method for determining goodness of fit related to microphone placement, including: when placing at least one microphone on at least one target device, generating a microphone placement model by performing a neural network training operation to minimize a value of a cost function (CF) by using sound feature information corresponding to a placement candidate point of the microphone; and when sound feature information obtained at a placement candidate point of a specific target device is inputted to the generated microphone placement model, determining goodness of fit related to microphone placement for the placement candidate point of the specific target device.

Herein, the method may further include obtaining sound feature information according to a position in the target device through simulated operation, based on specification information of the target device and placement information and specification information of a noise generating module to be placed in the target device, before generating the microphone placement model.

Herein, the obtaining sound feature information may include, according to the position in the target device, obtaining sound pressure intensity information and sound vibration intensity information of three or more directions detected based on the position, through simulated operation.

Herein, the obtaining sound pressure intensity information and the sound vibration intensity information may include: three-dimensionally modeling the target device; virtually dividing the three-dimensionally modeled target device into a plurality of regions; and according to a position of a microphone placed in each of the regions, obtaining, through simulated operation, at least one of sound pressure intensity information, sound vibration intensity information in an X axis direction, sound vibration intensity information in a Y axis direction, or sound vibration intensity information in a Z axis direction, detected based on the position in a three-dimensional space.

Herein, the generating a microphone placement model may include setting the cost function (CF) so that the smaller a numerical value of, according to the position in the target device, the sound pressure intensity information and the sound vibration intensity information of three or more directions detected based on the position becomes, the smaller a value of the cost function (CF) becomes.

Herein, the setting the cost function (CF) may include setting the cost function (CF) according to Equation 1 as follows: [Equation 1] $CF = W1*SP + W2*SaX + W3*SaY + W4*SaZ$. Herein, SP denotes sound pressure intensity information according to a position, SaX denotes noise vibration intensity information in an X axis direction according to a position, SaY denotes noise vibration intensity information in an Y axis direction according to a position, SaZ denotes noise vibration intensity information in a Z axis direction according to a position, each of W1 to W4 denotes a weight value used in the microphone placement model, a sum of W1 to D4 is 1, and each of SP, SaX, SaY and SaZ is a value which has been normalized as a value between 0 and 1.

The method may further include: recognizing article information of the specific target device; and recommending the placement candidate point for placing the microphone on the specific target device according to the recognized article information, based on sound feature information according to the position obtained through the simulated operation.

Herein, the determining information on the goodness of fit related to microphone placement may further include preferentially inputting the sound feature information, obtained at the recommended placement candidate point, to the microphone placement model.

In another aspect, there is provided an apparatus for determining goodness of fit related to microphone placement, including a storage and a processor, in which the processor is configured to: when placing at least one microphone on at least one target device, generate a microphone placement model by performing a neural network training operation to minimize a value of a cost function (CF) by using sound feature information corresponding to a placement candidate point of the microphone, and store the generated microphone placement model in the storage; and when sound feature information obtained at a placement candidate point of a specific target device is inputted to the generated microphone placement model, determine goodness of fit related to microphone placement for the placement candidate point of the specific target device.

Herein, the processor may be configured to obtain sound feature information according to a position in the target device through simulated operation, based on specification information of the target device and placement information and specification information of a noise generating module to be placed in the target device.

In another aspect, there is provided a non-transitory computer-readable recording medium having a recorded program to be executed on a computer.

Herein, when the program is executed by a processor, the program may include an executable command to allow the processor to be configured to: when at least one microphone is placed on at least one target device, generate a microphone placement model by performing a neural network training operation to minimize a value of a cost function (CF) by using sound feature information corresponding to a placement candidate point of the microphone, as an input; and when sound feature information obtained at a placement candidate point of a specific target device is inputted to the generated microphone placement model, determine goodness of fit related to microphone placement for the placement candidate point of the specific target device.

Herein, the program may include an executable command to allow the processor to be configured to obtain sound feature information according to a position in the target device through simulated operation, based on specification information of the target device and placement information and specification information of a noise generating module to be placed in the target device, before generating the microphone placement model.

The present disclosure is not limited to what has been described above, and other aspects, which are not mentioned, may be clearly understood by those skilled in the art from the description below.

As the optimal goodness of fit related to microphone placement may be determined in a designing step by providing a method and apparatus for determining goodness of fit related to microphone placement according to various embodiments of the present disclosure, efficiency for the use of a device may be improved, and as a speech input of a microphone is reinforced, the efficiency of speech recognition may be improved and accordingly, user convenience may be enhanced.

BRIEF DESCRIPTION OF THE DRAWINGS

The above and other aspects and features of the present disclosure will become apparent from the detailed description of the following aspects in conjunction with the accompanying drawings, in which.

DETAILED DESCRIPTION

Figure 1:
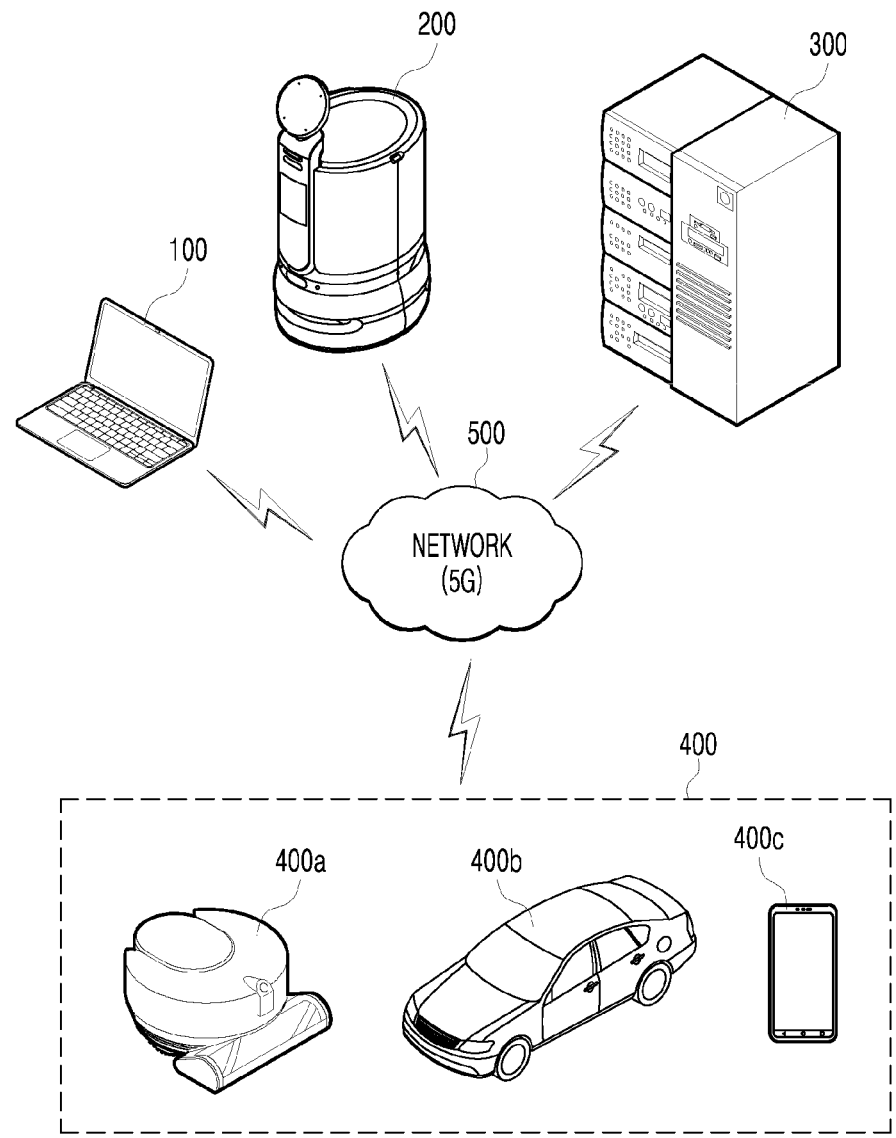
FIG. 1 is a schematic diagram showing a cloud system based on a 5G network according to an embodiment of the present disclosure.

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

The shapes, sizes, ratios, angles, the number of elements given in the drawings are merely exemplary, and thus the present disclosure is not limited to the illustrated details. Like reference numerals designate like elements throughout the specification.

In relation to describing the present disclosure, when the detailed description of the relevant known technology is determined to unnecessarily obscure the gist of the present disclosure, the detailed description may be omitted.

It will be understood that when an element is referred to as being "connected with" another element, the element can be connected with the other element or intervening elements may also be present. In contrast, when an element is referred to as being "directly connected with" another element, there are no intervening elements present.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Artificial intelligence refers to a field of studying artificial intelligence or a methodology for creating the same.

Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label.

In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

Extended reality (XR) collectively refers to virtual reality (VR), augmented reality (AR), and mixed reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to head-mounted display (HMD), head-up display (HUD), mobile phone, tablet PC, laptop computer, desktop computer, TV, digital signage, and so on, where a device employing the XR technology may be called an XR device.

FIG. 1 schematically shows a cloud system 1000 based on a 5G network according to an embodiment of the present disclosure.

The cloud system may define a variety of services that may be provided based on 5G and may include an apparatus 100 for determining goodness of fit related to microphone placement, a target device 200 on which a microphone is to be placed, an information providing system 300, various devices 400, and a 5G network 500. The apparatus 100 for determining goodness of fit related to microphone placement may be configured to determine suitability related to microphone placement.

When a microphone is placed on the target device 200, the apparatus 100 for determining goodness of fit related to microphone placement may output information on the goodness of fit related to microphone placement. In other words, the apparatus 100 for determining goodness of fit related to microphone placement may determine where to mount the microphone on the target device 200 based on sound pressure intensity information that may be collected and noise vibration information detected in three or more directions.

The apparatus 100 for determining goodness of fit related to microphone placement may be implemented as, for example, a notebook computer, a desktop computer, a workstation, but in some embodiments, the apparatus 100 for determining goodness of fit related to microphone placement may include, for example, a robot cleaner, a mobile phone, a smart phone, a digital broadcasting terminal, a personal digital assistant (PDA), a portable multimedia player (PMP), a navigation device, a slate PC, a tablet PC, a ultrabook, and a wearable device (for example, a smart watch, a smart glass, a head mounted display (HMD)).

The target device 200 is a device on which a microphone is placed, and may request various pieces of information to the apparatus 100 for determining goodness of fit related to microphone placement and may receive various information from the apparatus 100 for determining goodness of fit related to microphone placement. In the present specification, the target device 200 is assumed to be a delivery robot, but the embodiment is not limited thereto.

The information providing system 300 may transmit various information to the apparatus 100 for determining goodness of fit related to microphone placement or the target device 200 according to a request of the apparatus 100 or the target device 200. The information providing system 300 may include a plurality of servers and may be implemented as a cloud type system.

The various devices 400 may include, for example, home appliances such as a robot cleaner 400a, a refrigerator, a washing machine, an air conditioner, and an AI speaker, an autonomous vehicle 400b, and a mobile terminal 400c, and may transmit and receive various information via the 5G network.

The various devices 400 may be connected to the apparatus 100 for determining goodness of fit related to microphone placement, the target device 200, and the information providing system 300 via the 5G network 500 (for example, the Internet) in a wired or wireless manner. Although not shown, the various devices 400 may include a sound pressure measurer and a sound vibration sensor (for example, a three-axis or more noise acceleration sensor).

The apparatus 100 for determining goodness of fit related to microphone placement may communicate with, for example, the information providing system 300 and various devices 400 via the network 500 by using a communication module. The apparatus 100 for determining goodness of fit related to microphone placement may request various information to the information providing system 300 and may receive various calculated or searched information from the information providing system 300. The calculating or searching may include a calculation or search related to artificial intelligence.

The apparatus 100 for determining goodness of fit related to microphone placement, the target device 200, the information providing system 300, and the various devices 400 are all equipped with a 5G module to transfer data at a speed of 100 Mbps to 20 Gbps (or higher), which allows transmission of large-capacity video files to various devices and allows operation at a low power to thereby minimize power consumption. However, the transmission rate may be implemented differently according to an embodiment.

The 5G network 500 may provide a communication environment for devices in a wired or wireless manner, including a 5G mobile communication network, a local area network, and the Internet.

Hereinafter, the operation of the apparatus 100 for determining goodness of fit related to microphone placement will be described schematically with reference to FIG. 2.

A specific target device 200 may be a device on which a microphone is to be actually placed. The specific target device 200 may have one or more microphones placed thereon in order to recognize a speech of a user.

The apparatus 100 for determining goodness of fit related to microphone placement (FIG. 1) may use a microphone placement model 151 (FIG. 3) to be described later in order to determine goodness of fit related to microphone placement of the target device 200. In addition, the apparatus 100 for determining goodness of fit related to microphone placement may obtain input data necessary for training the microphone placement model 151 through a simulation program. The input data may be used as a label for supervised learning. The simulation program may be executed in the apparatus 100 for determining goodness of fit related to microphone placement, but in some embodiments, the simulation program may be executed in an external device.

Here, the input data required for training the microphone placement model 151 may be sound feature information obtained at placement candidate points in the target device 200, and the sound feature information may be sound pressure intensity information measured by an external pressure measurer and sound vibration intensity information in three directions (XYZ axes) measured by an external sound vibration sensor, but the sound feature information may be calculated without being directly measured through the simulation program.

When the microphone placement model 151 is trained and generated (completed), the apparatus 100 may determine the goodness of fit related to microphone placement by using the microphone placement model 151. Specifically, the apparatus 100 for determining goodness of fit related to microphone placement may obtain information on the goodness of fit of placement candidate points CM1 and CM2 which minimize the value of a cost function (described later) of the specific target device 200 and may output the obtained information.

Figure 2:
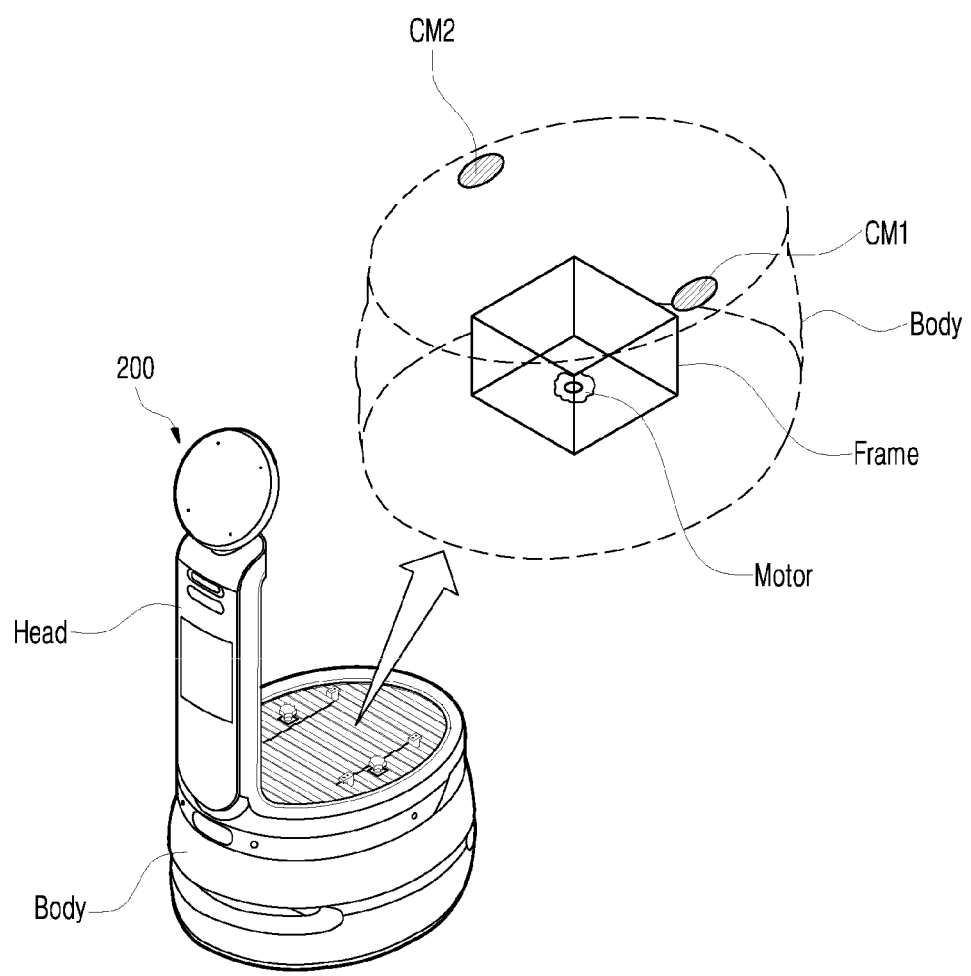
FIG. 2 is a diagram for schematically explaining the operation of an apparatus for determining goodness of fit related to microphone placement according to an embodiment of the present disclosure.

In FIG. 2, the target device 200 may be a delivery robot 200 capable of delivery, and the delivery robot 200 may include a head and a body. A motor, which is a noise generating module disposed in a frame for movement, may be disposed inside the body.

The apparatus 100 for determining goodness of fit related to microphone placement may select placement candidate points CM1 and CM2 far from the motor, and may calculate and output the goodness of fit for the placement candidate points CM1 and CM2.

As such, the apparatus 100 for determining goodness of fit related to microphone placement may determine the optimal microphone placement position based on the information on the goodness of fit for the candidate points CM1 and CM2. For example, when only one microphone is installed, the apparatus 100 for determining goodness of fit related to microphone placement may determine the candidate point CM1 as the microphone placement point.

Hereinafter, the configuration of the apparatus 100 for determining goodness of fit related to microphone placement according to an embodiment of the present disclosure will be described with reference to FIG. 3.

Figure 3:
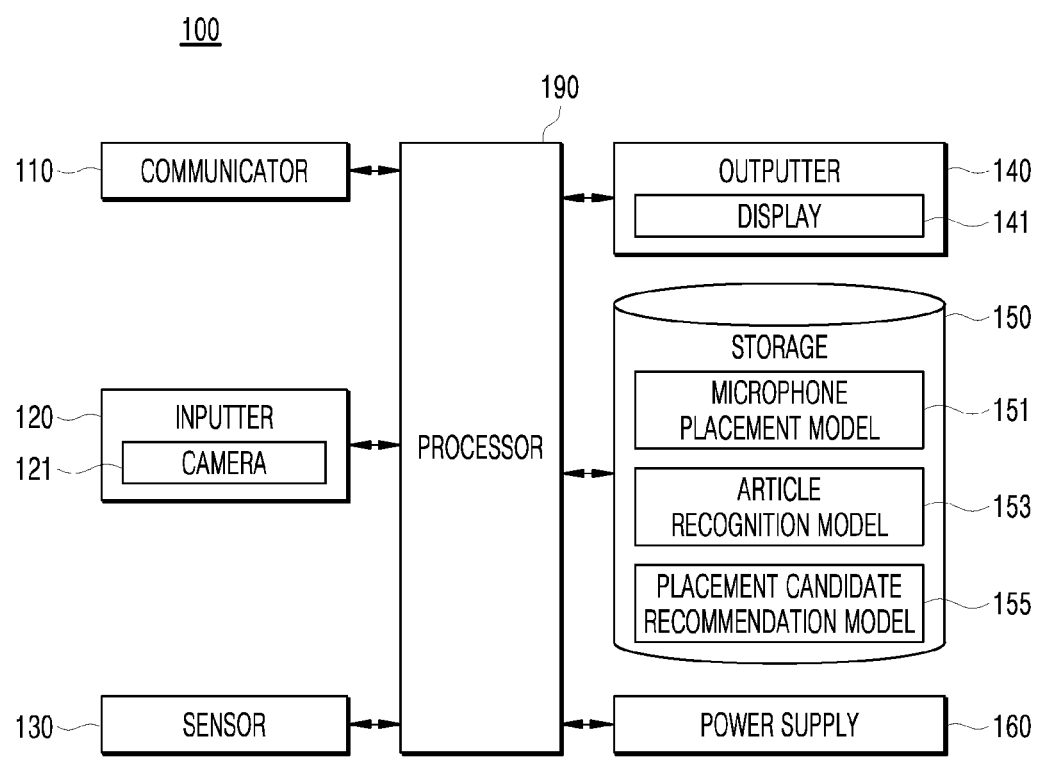
FIG. 3 is a block diagram showing the configuration of an apparatus for determining goodness of fit related to microphone placement according to an embodiment of the present disclosure.

Referring to FIG. 3, the apparatus 100 for determining goodness of fit related to microphone placement may include a communicator 110, an inputter 120, a sensor 130, an outputter 140, a storage 150, a power supply 160, and a processor 190. The components shown in FIG. 3 are not essential to implementing the apparatus 100 for determining goodness of fit related to microphone placement such that the apparatus 100 described herein may have more or fewer components than those listed above.

The communicator 110 may transmit and receive data to and from various communication entities shown in FIG. 1 by using wired or wireless communication technologies. For example, the communicator 110 may transmit and receive sensor information, user input information, information about a trained model, and control signal information to and from the target device 200 on which a microphone is to be placed, the information providing system 300, and various devices 400, but the transmitted information is not limited to these examples. In addition, the communicator 110 may communicate with a sound pressure measurer and a sound vibration sensor.

In this case, the communicator 110 may include a mobile communication module and a short-range communication module. The mobile communication module may communicate through technologies such as Global System for Mobile Communication (GSM), code division multi access (CDMA), Long Term Evolution (LTE), and 5G. The short-range communication module may communicate through technologies such as a wireless LAN (WLAN), Wireless-Fidelity (Wi-Fi), Bluetooth™, radio frequency identification (RFID), Infrared Data Association (IrDA), ZigBee, and near field communication (NFC).

The inputter 120 may include a camera 121 for inputting an image signal, a microphone for receiving an audio signal, and a user inputter for receiving information inputted by a user. In this case, the signal obtained from the camera 121 or the microphone may be referred to as sensing data or sensor information by treating the camera 121 or the microphone as a sensor.

The inputter 120 may obtain, for example, training data for model training and input data used when output is obtained by using a trained model. The inputter 120 may obtain raw input data.

In this case, the processor 190 may extract an input feature by preprocessing the input data.

The sensor 130 may obtain at least one of internal information of the the apparatus 100 for determining goodness of fit, surrounding environment information of the apparatus 100 for determining goodness of fit, or user information by using various sensors.

At this time, the sensor included in the sensor 130 may include, for example, a distance sensor, a proximity sensor, an illumination sensor, an acceleration sensor, a magnetic sensor, a gyro sensor, an inertial sensor, a RGB sensor, an IR sensor, a fingerprint recognition sensor, a ultrasonic sensor, a light sensor (including the camera 121), a microphone, a lidar, and a radar.

The outputter 140 may generate an output related to visual, auditory, or tactile senses. The outputter 140 may include a display 141 for outputting visual information, a speaker for outputting auditory information, and a haptic module for outputting tactile information.

The storage 150 may store data supporting various functions of the apparatus 100 for determining goodness of fit related to microphone placement. The storage 150 may store a plurality of application programs or applications that are operated by the apparatus 100 for determining goodness of fit related to microphone placement, data for operating the apparatus 100, and instructions.

The storage 150 may include, for example, the microphone placement model 151, an article recognition model 153, and a placement candidate recommendation model 155.

When one or more microphones are placed on one or more target devices, the microphone placement model 151 may be generated by performing a neural network training operation such that a value of a cost function (CF), which will be described later, is minimized by using sound feature information corresponding to placement candidate points of the microphones as an input. The microphone placement model 151 may be generated by supervised learning, and the label may be collected through the above-described simulation program and may include measurement information.

The article recognition model 153 may be a model that recognizes article information when the article information is included in image information inputted through the camera 121 or the inputter 120. The placement candidate recommendation model 155 may be a model for recommending a point where the microphone is to be placed based on the specification information of article information when the article information is recognized.

The article recognition model 153 may be a model that maps article information corresponding to various photographed objects and may be generated by supervised learning. As a result, data that maps product information corresponding to various photographed objects may be essential for model formation.

The placement candidate recommendation model 155 may be a model that recommends a candidate placement point of a microphone on the specific target device 200, based on the sound feature information for respective points of various target devices, which is collected through a simulation program. The placement candidate recommendation model 155 may also be generated by supervised learning, and label information may be required for model generation and verification. The target device 200 may be an artificial intelligence speaker, but embodiments are not limited thereto.

The power supply 160 may receive power from an external power source and an internal power source under the control of the processor 190 to supply power to each component of the apparatus 100 for determining goodness of fit related to microphone placement. The power supply 160 may include a battery, and the battery may be a built-in battery or a replaceable battery. The battery may be charged by using a wired or wireless charging method. Here, the wireless charging method may include a magnetic induction method or a magnetic resonance method.

The processor 190 may be a module that controls the components of the apparatus 100 for determining goodness of fit related to microphone placement. The processor 190 may refer to a data processing apparatus embedded in hardware having a physically structured circuit for performing a function represented by a code or an instruction included in a program. The processor 190 may include, for example, a central processing unit (CPU) for controlling the entire system, an application processor for driving a process related to an application. However, in some embodiments, the processor 190 may include a processing device such as a microprocessor, a processor core, a multiprocessor, an application-specific integrated circuit (ASIC), or a field programmable gate array (FPGA), but the scope of the present disclosure is not limited thereto.

Hereinafter, various operations of the processor 190 will be described.

The processor 190 may collect device type information (for example, a speaker, a washing machine, and a refrigerator) and specification information of a plurality of target devices on which a microphone is to be placed, and placement information and specification information of a noise-generating module which may be placed on the target devices.

Specification information of the plurality of target devices may include, for example, dimension information (for example, size, numerical value, height, and area information), appearance information (including three-dimensional information), shape information, and specification information. When necessary, the specification information may be collected from the information providing system 300.

Specification information of a noise generating module capable of being placed on the target device may include, for example, dimension information (for example, size, numerical value, height, and area information), appearance information (including three-dimensional information), shape information, and specification information.

The processor 190 may acquire sound feature information according to the location in at least one target device through simulation based on the above-described information. Here, the sound feature information may include, for example, sound pressure intensity information and sound vibration intensity information but may include other information depending on the embodiment.

The sound pressure intensity information may be a value for measuring the sound pressure of the sound measured by the sound pressure measurer. The sound vibration intensity information may be a value obtained by measuring noise vibration intensity information of three or more axes, and may be information indicating the directionality of the noise from the position where the microphone is to be placed. For example, at a specific point, when the sound vibration intensity value is large, the noise is directly input to the specific point. When the sound vibration intensity value is small, the noise is input indirectly by bypassing the specific point. The processor 190 may determine that the smaller the sound vibration intensity value is, the smaller the influence of the noise generating module becomes. The processor 190 may select the point where both the sound pressure intensity information and the sound vibration intensity information are the smallest as the placement point of the microphone, or select the placement point of the microphone by applying a weight to any information.

The processor 190, according to the position in the target device, may obtain sound pressure intensity information and sound vibration intensity information of three or more directions detected based on the position, through the simulated operation. Here, the three directions may include an X axis, a Y axis, and a Z axis in a three-dimensional space.

The sound pressure intensity information may be calculated by the sound pressure measurer, and the sound vibration intensity information of three or more directions may be collected through a noise vibration sensor (for example, a three-axis or five-axis noise acceleration sensor). Here, the sound pressure intensity information indicates the intensity (size) of the sound, and the sound vibration intensity information includes the directionality information of the sound entering the microphone, through which the frequency of the sound may be distorted to detect a problem that has occurred in the signal phase.

The processor 190 may three-dimensionally model the target device and may virtually divide the three-dimensionally modeled target device into a plurality of regions. The processor 190, according to a position of a microphone placed in each of the regions, may obtain, through the simulated operation, at least one of sound pressure intensity information, sound vibration intensity information in the X axis direction, sound vibration intensity information in the Y axis direction, or sound vibration intensity information in the Z axis direction, detected based on the position in the three-dimensional space.

That is, when performing the simulation, the processor 190 may extract sound feature information of the corresponding area unit through a noise analysis program in narrow area units within the target device. Thus, the processor 190 may search for the optimal microphone position of the inputted target device. The processor 190 may set the optimal microphone placement candidate group and input the candidate group to a trained model to be generated. That is, the processor 190 may input information corresponding to the optimal candidate group of the microphone extracted from the simulation program (both sound pressure intensity information and the sound vibration intensity information have small values) to the trained model (the microphone placement model being trained).

When the processor 190 places one or more microphones on one or more target devices, the processor 190 may perform a neural network training operation in order to minimize the value of a cost function (CF) by using sound feature information corresponding to the placement candidate point of the microphone, to thereby generate the microphone placement model 151, and may store the generated microphone placement model 151 in the storage 150.

When sound feature information measured at the placement candidate point of the specific target device 200 is inputted to the generated microphone placement model 151, the processor 190 may determine the goodness of fit related to microphone placement for the placement candidate point.

Here, the placement candidate point may be a point where the goodness of fit related to microphone placement of various devices inputted to a simulation program is excellent. In an optional embodiment, the processor 190 may use the sound feature information, of all the points where the goodness of fit related to microphone placement is poor, as input data of the microphone placement model 151.

Herein, when setting the cost function CF, the processor 190 may set the cost function CF so that the smaller a value of, according to the position in the target device, the sound pressure intensity information and the sound vibration intensity information of three directions or more detected based on the position becomes, the smaller a value of the cost function CF becomes. That is, as the cost function CF approaches 0, the apparatus 100 for determining goodness of fit related to microphone placement may determine the corresponding point as the point of the target device that is free from internal or external noise, and may place the microphone at the point.

The cost function CF may be set as follows.

$$CF = W1*SP + W2*SaX + W3*SaY + W4*SaZ$$

Where SP denotes sound pressure intensity information according to position, SaX denotes noise vibration intensity information in the X-axis direction according to position, SaY denotes noise vibration intensity information in the Y-axis direction according to position, and SaZ denotes noise vibration intensity information in the Z-axis direction according to position, each of W1 to W4 denotes a weight value used in the microphone placement model, and the total sum of W1 to W4 may be set to 1. The weight becomes the most suitable value while performing the neural network algorithm, so that the relationship between the sound pressure intensity information and the noise vibration intensity information may be established in the cost function.

Also, the sound pressure intensity information SP according to the position may be 0 dB to 130 dB, and 0 dB may be normalized as 0 and 130 dB may be normalized as 1 to thereby be inputted to the cost function CF.

In addition, the noise vibration intensity information SaX, SaY, and SaZ according to the position may be expressed as m/s2 as acceleration information, but 0 m/s2 may be normalized as 0 and 100 m/s2 may be normalized as 1. However, the numerical range represents the minimum value and the maximum value that the device may measure, and other ranges may be possible depending on the performance of the device.

The processor 190 may set the weights W1 to W4 so that the apparatus 100 for determining goodness of fit related to microphone placement may consider both the sound pressure intensity information and the multi-axis noise vibration intensity information. Accordingly, the noise vibration intensity information for measuring the phase change due to the frequency distortion as well as the pressure of the sound may be considered, so that the goodness of fit related to microphone placement may be improved. In addition, the multi-axis noise vibration intensity information includes more than three axes, which may increase the measurement accuracy.

The microphone placement model 151 may receive sound feature information corresponding to microphone candidate placement points collected by a number of input devices, and may calculate the weight value such that the value of the cost function CF becomes minimum while changing the weight value so that the sum of the weights W1 to W4 becomes 1. Minimizing the cost function CF may include minimizing the minimum value of the cost function CF for each point.

When the processor 190 places one or more microphones on one or more target devices, the processor 190 may perform a neural network training operation in order to minimize the value of the cost function (CF) by using sound feature information corresponding to the placement candidate point of the microphone to thereby generate the microphone placement model 151. The generated microphone placement model 151 may be stored in the storage 150.

In addition, the processor 190 may photograph the specific target device 200 through the camera 121 and recognize article information of the photographed specific target device 200.

The processor 190 may recommend placement candidate points for placing a microphone on the specific target device 200, based on sound feature information according to the position obtained through the simulated operation. To this end, the processor 190 may include an object recognition module, a vision information extraction module, and a neural network calculator.

In addition, the processor 190 may preferentially input sound feature information obtained at the recommended placement candidate point to the microphone placement model. Accordingly, when only one microphone is placed in the specific target device 200, the calculation may be completed in a one time calculation. When several microphones are placed, the microphones may be placed in the order of calculation.

Figure 4:
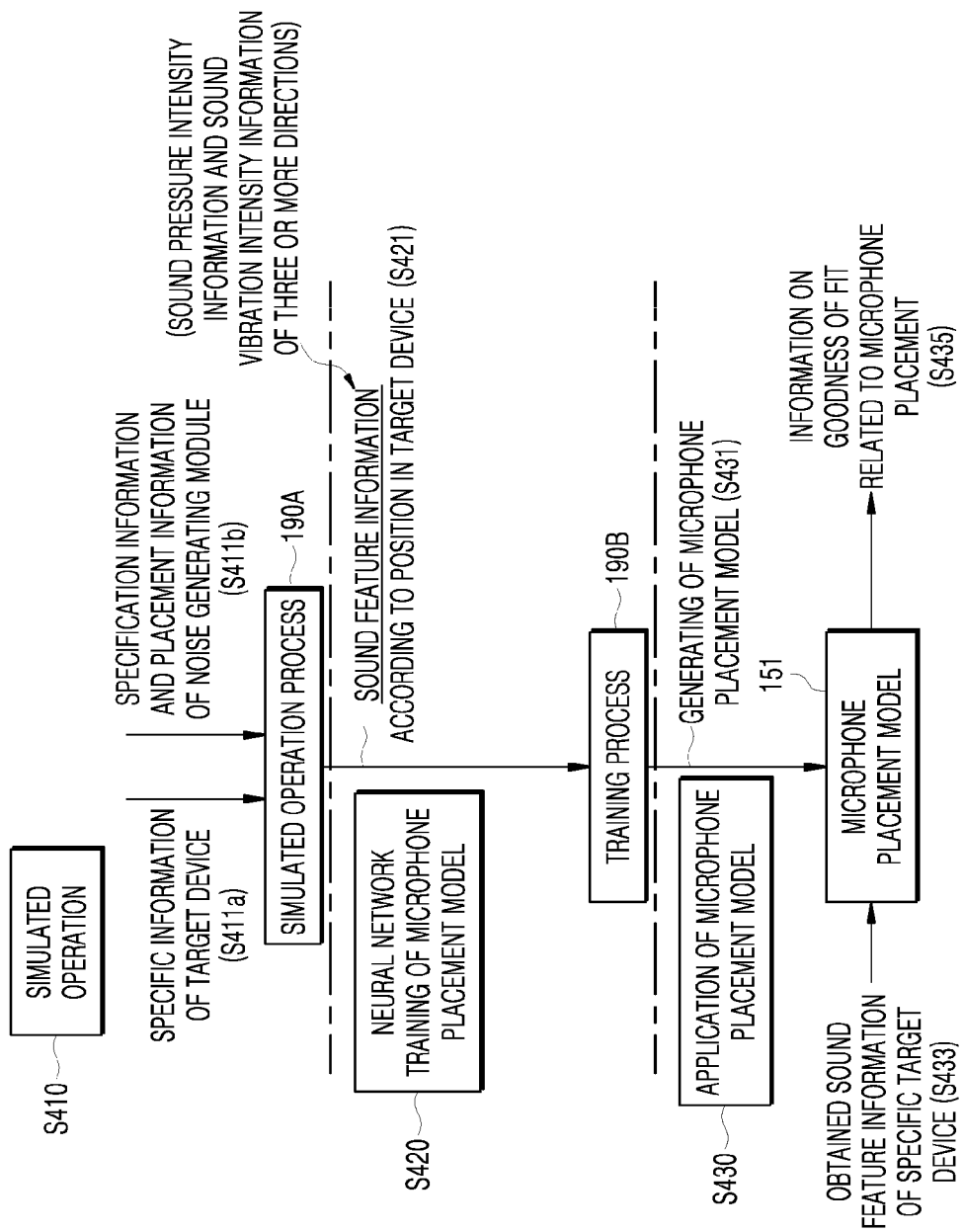
FIG. 4 is a block sequence diagram showing the operation of an apparatus for determining goodness of fit related to microphone placement according to an embodiment of the present disclosure.
Figure 5:
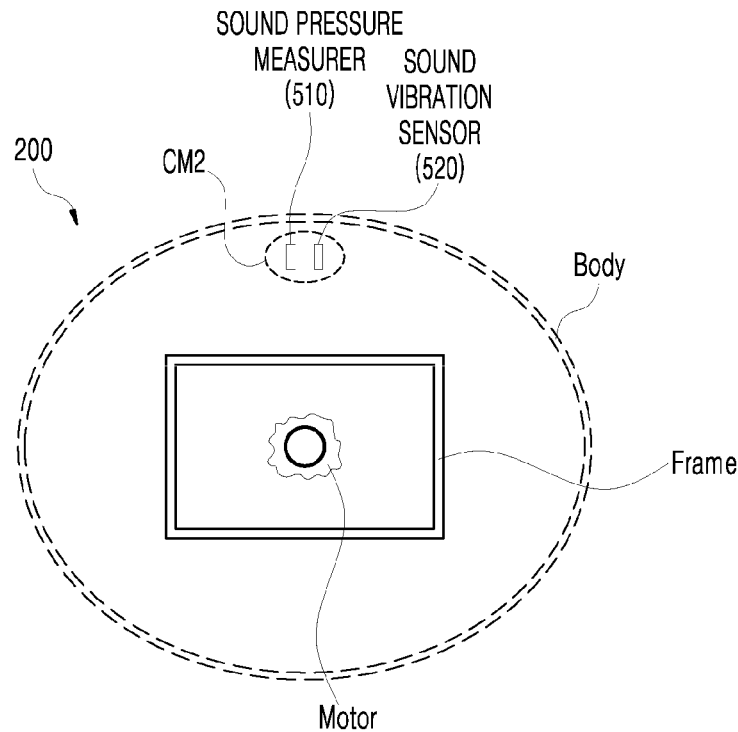
FIG. 5 is a diagram for explaining a method for extracting sound feature information from candidate placement points of a microphone according to an embodiment of the present disclosure.
Figure 6:
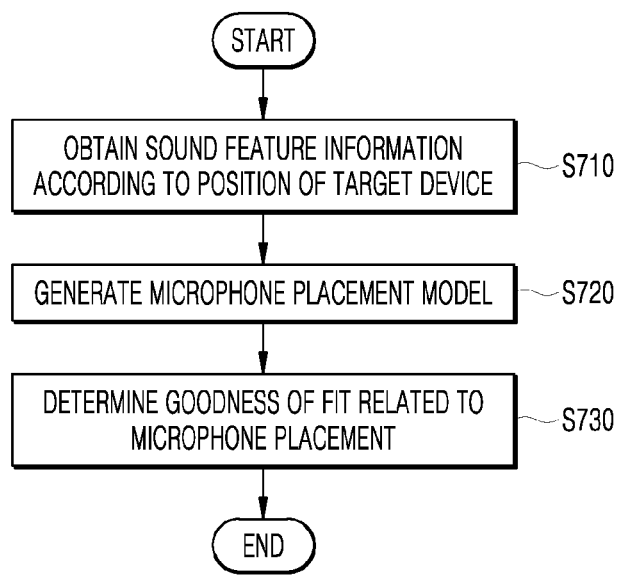
FIG. 6 is a sequence diagram showing the operation of an apparatus for determining goodness of fit related to microphone placement according to an embodiment of the present disclosure.

FIGS. 4 to 6 are diagrams for describing the operation of the apparatus 100 for determining goodness of fit related to microphone placement according to various embodiments of the present disclosure.

Referring to FIG. 4, the apparatus 100 for determining goodness of fit related to microphone placement may perform a simulated operation in step S401, a neural network training of the microphone placement model in step S420, and an application of the microphone placement model in step S430.

The simulated operation in step S410 does not necessarily need to be performed in the apparatus 100 for determining goodness of fit related to microphone placement, but it is assumed in the present specification that step S410 is performed.

A simulated operation process 190A receives the specification information of a target device in step S411a, receives the specification information and the layout information of the noise generating module in step S411b, and outputs sound feature information according to the position in the target device in step S421.

The neural network training of the microphone placement model in step S420 receives sound feature information of various devices and performs a training process 190B.

The training process 190B generates a microphone placement model in step S431.

In the applying the microphone placement model in step S430, the microphone placement model 151 may output the goodness of fit related to microphone placement, in step S435, by using the acquired sound feature information of the specific target device as an input in step S433.

The information on the goodness of fit related to microphone placement in step S435 may be outputted as a numerical value, and information on whether the inputted point is appropriate may be outputted, but the embodiment is not limited to this example.

FIG. 5 is a diagram illustrating the operation of the apparatus 100 for determining goodness of fit related to microphone placement for extracting sound feature information at candidate placement points of a microphone according to an embodiment of the present disclosure.

The apparatus 100 for determining goodness of fit related to microphone placement may recommend placement candidate points of the microphone as described above. Specifically, the apparatus 100 for determining goodness of fit related to microphone placement may recognize article information of the specific target device and may recommend the placement candidate point CM2 where the microphone may be placed on the specific target device, based on sound feature information according to the position obtained via the operation of the simulation.

The apparatus 100 for determining goodness of fit related to microphone placement may place a sound pressure measurer 510 and a sound vibration sensor 520 at the candidate placement point CM2 of the microphone to thereby receive sound feature information. The input of the information may be performed via a means of communication, and in some embodiments, the sound pressure measurer 510 and the sound vibration sensor 520 may be included in the apparatus 100 for determining goodness of fit related to microphone placement.

FIG. 6 is a sequence diagram showing the operation of the apparatus 100 for determining goodness of fit related to microphone placement according to an embodiment of the present disclosure.

The apparatus 100 for determining goodness of fit related to microphone placement acquires sound feature information according to the position of the target device in step S710.

The apparatus 100 for determining goodness of fit related to microphone placement may obtain sound feature information according to the position in the target device via the operation of the simulation, based on the specification information of the target device and placement information and specification information of the noise generating module which may be placed in the target device.

The apparatus 100 for determining goodness of fit related to microphone placement, according to the position in the target device, may obtain sound pressure intensity information and sound vibration intensity information of three or more directions detected based on the position through the simulated operation.

Specifically, the apparatus 100 for determining goodness of fit related to microphone placement may three-dimensionally model the target device, may virtually divide the three-dimensionally modeled target device into a plurality of pieces of regions, and, according to the position, may obtain at least one of the sound pressure intensity information, the sound vibration intensity information in the X-axis direction, the sound vibration intensity information in the Y-axis direction, or the sound vibration intensity information in the Z-axis direction detected based on the position in a three-dimensional space.

After obtaining sound feature information in step S701, when one or more microphones are placed on one or more target devices, the apparatus 100 for determining goodness of fit related to microphone placement may perform the neural network training operation so that the value of the cost function CF becomes the minimum value, by using sound feature information corresponding to the placement candidate point of the microphone as an input, to thereby generate a microphone placement model in step S720.

The generating the microphone placement model, in step S720, may include the step of setting the cost function CF such that the smaller the value of the sound pressure intensity information according to the position in the target device and the sound vibration intensity information detected in three or more directions based on the position becomes, the smaller the value of the cost function CF becomes. The cost function has been described above and will be omitted here.

After generating the microphone placement model, in step S720, when sound feature information obtained at the placement candidate point of the target device is inputted to the generated microphone placement model, the apparatus 100 for determining goodness of fit related to microphone placement determines the goodness of fit for the placement candidate point of the specific target device in step S730.

In addition, the apparatus 100 for determining goodness of fit related to microphone placement may recommend candidate placement points for placing a microphone on the specific target device 200.

The present disclosure described above may be implemented as a computer-readable code in a medium on which a program is written. The computer readable medium includes all types of recording devices in which data readable by a computer system can be stored. Examples of the computer readable medium include a hard disk drive (HDD), a solid state disk (SSD), a silicon disk drive (SDD), a read-only memory (ROM), a random-access memory (RAM), CD-ROM, a magnetic tape, a floppy disk, and an optical data storage device. In addition, the computer may include the processor 190 of the apparatus 100 for determining goodness of fit related to microphone placement.

In the foregoing, while specific embodiments of the present disclosure have been described for illustrative purposes, the scope or spirit of the present disclosure is not limited thereto, and it will be understood by those skilled in the art that various changes and modifications may be made to other specific embodiments without departing from the spirit and scope of the present disclosure. Therefore, the scope of the present disclosure should be defined not by the above-described embodiments but by the technical idea defined in the following claims.

What is claimed is:

1. A method of controlling an apparatus for determining goodness of fit related to microphone placement, the method comprising:
   receiving, by a processor in the apparatus, virtual sound feature information corresponding to one or more positions on a target device, the virtual sound feature information being generated through a simulated operation based on specification information of the target device, placement information of a noise generating module in the target device, and specification noise generation information of the noise generating module in the target device;
   generating, by the processor, a microphone placement model by performing a neural network training operation to minimize a value of a cost function (CF) by using the virtual sound feature information corresponding to a placement candidate point for deciding where to place the at least one microphone on the target device; and
   determining, by the processor, goodness of fit information for the placement candidate point based on an output of the microphone placement model and outputting the goodness of fit information.

2. The method of claim 1, wherein the virtual sound feature information is based on simulated pressure intensity information corresponding to the one or more positions and simulated sound vibration intensity information in three or more directions corresponding to the one or more positions.

3. The method of claim 1, further comprising:
   three-dimensionally modeling the target device to generate a three-dimensionally modeled target device;
   virtually dividing the three-dimensionally modeled target device into a plurality of regions; and
   generating at least one of simulated sound pressure intensity information, simulated sound vibration intensity information in an X axis direction, simulated sound vibration intensity information in a Y axis direction or simulated sound vibration intensity information in a Z axis direction corresponding to at least one position of a microphone being placed in each of the plurality of regions.

4. The method of claim 1, wherein the generating the microphone placement model comprises:
   setting the cost function (CF) so that as numerical values of the sound pressure intensity information and the sound vibration intensity information of the three or more directions based on the position become smaller, a value of the cost function (CF) becomes smaller.

5. The method of claim 4, wherein the setting the cost function (CF) comprises:
   setting the cost function (CF) according to Equation 1 shown below:

$$CF = W1*SP + W2*SaX + W3*SaY + W4*SaZ \qquad \text{[Equation 1]}$$

wherein SP denotes sound pressure intensity information according to a position, SaX denotes noise vibration intensity information in an X axis direction according to a position, SaY denotes noise vibration intensity information in an Y axis direction according to a position, SaZ denotes noise vibration intensity information in a Z axis direction according to a position, each of W1 to W4 denotes a weight value used in the microphone placement model, a sum of W1 to W4 is 1, and each of SP, SaX, SaY and SaZ is a value which has been normalized as a value between 0 and 1.

6. The method of claim 1, further comprising:
   determining article information of the target device based on an image of the target device; and
   determining a recommended placement candidate point for placing the at least one microphone on the target device according to the article information, based on the virtual sound feature information obtained through the simulated operation.

7. The method of claim 6, wherein the determining the goodness of fit information comprises:
   inputting virtual sound feature information, obtained at the recommended placement candidate point via simulation, to the microphone placement model, or
   inputting actual sound feature information obtain by a physical sensor placed at the recommended placement candidate point on the target device to the microphone placement model.

8. An apparatus for determining goodness of fit related to microphone placement, the apparatus comprising:
   a storage; and
   a processor configured to:
      receive virtual sound feature information corresponding to one or more positions on a target device, the virtual sound feature information being generated through a simulated operation based on specification information of the target device, placement information of a noise generating module in the target device, and specification noise generation information of the noise generating module in the target device, generate a microphone placement model by performing a neural network training operation to minimize a value of a cost function (CF) by using the virtual sound feature information corresponding to a placement candidate point for deciding where to place the at least one microphone on the target device, and determine goodness of fit information for the placement candidate point based on an output of the microphone placement model and outputting the goodness of fit information.

9. The apparatus of claim 8, wherein the virtual sound feature information is based on simulated pressure intensity information corresponding to the one or more positions and simulated sound vibration intensity information in three or more directions corresponding to the one or more positions.

10. The apparatus of claim 8, wherein the processor is configured to:

three-dimensionally model the target device to generate a three-dimensionally modeled target device;

virtually divide the three-dimensionally modeled target device into a plurality of regions; and generate at least one of simulated sound pressure intensity information, simulated sound vibration intensity information in an X axis direction, simulated sound vibration intensity information in a Y axis direction or simulated sound vibration intensity information in a Z axis direction corresponding to at least one position of a microphone being placed in each of the plurality of regions.

11. The apparatus of claim 8, wherein the processor is further configured to:

set the cost function (CF) so that as numerical values of the sound pressure intensity information and the sound vibration intensity information of the three or more directions based on the position become smaller, a value of the cost function (CF) becomes smaller.

12. The apparatus of claim 11, wherein the processor is further configured to set the cost function (CF) according to Equation 1 shown below:

$$CF=W1*SP+W2*SaX+W3*SaY+W4*SaZ,\quad\text{[Equation 1]}$$

wherein SP denotes sound pressure intensity information according to a position, SaX denotes noise vibration intensity information in an X axis direction according to a position, SaY denotes noise vibration intensity information in an Y axis direction according to a position, SaZ denotes noise vibration intensity information in a Z axis direction according to a position, each of W1 to W4 denotes a weight value used in the microphone placement model, a sum of W1 to W4 is 1, and each of SP, SaX, SaY and SaZ is a value which has been normalized as a value between 0 and 1.

13. The apparatus of claim 8, further comprising:
a camera,
wherein the processor is further configured to:
receive an image of the target device captured by the camera,
determine article information of the target device based on the image, and
determine a recommended placement candidate point for placing the at least one microphone on the target device according to the article information, based on the virtual sound feature information obtained through the simulated operation.

14. The apparatus of claim 13, wherein the processor is further configured to:

input virtual sound feature information, obtained at the recommended placement candidate point via simulation, to the microphone placement model, or input actual sound feature information obtain by a physical sensor placed at the recommended placement candidate point on the target device to the microphone placement model.

15. A non-transitory computer-readable recording medium having a recorded program to be executed on a computer, wherein, when the program is executed by a processor, the program comprises an executable command to allow the processor to be configured to:

receive virtual sound feature information corresponding to one or more positions on a target device, the virtual sound feature information being generated through a simulated operation based on specification information of the target device, placement information of a noise generating module in the target device, and specification noise generation information of the noise generating module in the target device, generate a microphone placement model by performing a neural network training operation to minimize a value of a cost function (CF) by using the virtual sound feature information corresponding to a placement candidate point for deciding where to place the at least one microphone on the target device, and determine goodness of fit information for the placement candidate point based on an output of the microphone placement model and outputting the goodness of fit information.

16. The method of claim 1, wherein the goodness of fit information output by the processor includes a recommended placement candidate point identifying a position on the target device for placing the at least one microphone on the target device.

17. The method of claim 1, further comprising:

receiving actual sound feature information from a physical sensor placed on the target device or another device; and training the microphone placement model based on the actual sound feature information.

18. The apparatus of claim 8, wherein the goodness of fit information output by the processor includes a recommended placement candidate point identifying a position on the target device for placing the at least one microphone on the target device.

19. The apparatus of claim 8, wherein the processor is further configured to:

receive actual sound feature information from a physical sensor placed on the target device or another device; and train the microphone placement model based on the actual sound feature information.

* * * * *